(12) United States Patent
Ramamurthy

(10) Patent No.: US 10,466,354 B2
(45) Date of Patent: Nov. 5, 2019

(54) VIRTUAL POINT SOURCES IN ULTRASOUND IMAGING

(71) Applicant: Carestream Health, Inc., Rochester, NY (US)

(72) Inventor: Bhaskar Ramamurthy, Los Altos, CA (US)

(73) Assignee: Carestream Health, Inc., Rochester, NY (US)

( * ) Notice: Subject to any disclaimer, the term of this patent is extended or adjusted under 35 U.S.C. 154(b) by 770 days.

(21) Appl. No.: 15/029,974

(22) PCT Filed: Oct. 17, 2014

(86) PCT No.: PCT/CA2014/051007
§ 371 (c)(1),
(2) Date: Apr. 15, 2016

(87) PCT Pub. No.: WO2015/054795
PCT Pub. Date: Apr. 23, 2015

(65) Prior Publication Data
US 2016/0266252 A1   Sep. 15, 2016

Related U.S. Application Data

(60) Provisional application No. 61/893,140, filed on Oct. 18, 2013.

(51) Int. Cl.
*G01S 15/89* (2006.01)

(52) U.S. Cl.
CPC ...... *G01S 15/8915* (2013.01); *G01S 15/8997* (2013.01)

(58) Field of Classification Search
CPC ............ G01S 15/8915; G01S 7/52047; G01S 15/8997; G10K 11/346
See application file for complete search history.

(56) References Cited

U.S. PATENT DOCUMENTS

| | | | |
|---|---|---|---|
| 6,527,723 B2 | 3/2003 | Ossmann et al. | |
| 6,551,246 B1 | 4/2003 | Ustuner et al. | |
| 6,599,245 B1 * | 7/2003 | Ma | G01S 7/52046 600/437 |
| 6,629,929 B1 * | 10/2003 | Jago | G01S 7/52046 600/443 |
| 8,551,000 B2 | 10/2013 | Chiang et al. | |
| 2009/0234230 A1 | 9/2009 | Bercoff et al. | |

FOREIGN PATENT DOCUMENTS

EP   1563318 B1   1/2007

OTHER PUBLICATIONS

Nikolov, S.I., Synthetic Aperture Tissue and Flow Ultrasound Imaging, Ph.D Dissertation, Aug. 31, 2001.

* cited by examiner

*Primary Examiner* — Isam A Alsomiri
*Assistant Examiner* — Amie M Ndure

(57) ABSTRACT

Ultrasound methods involve generating ultrasound using virtual point sources. Apodization may be applied selectively to transducer elements to provide improved uniformity of response. Virtual point sources may be located at positions that are independent of transducer geometry. The number and/or locations of virtual point sources may be selected to cover a region of interest with a reduced number of ultrasound transmissions.

33 Claims, 13 Drawing Sheets

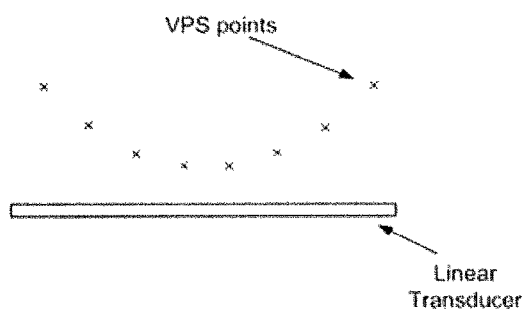 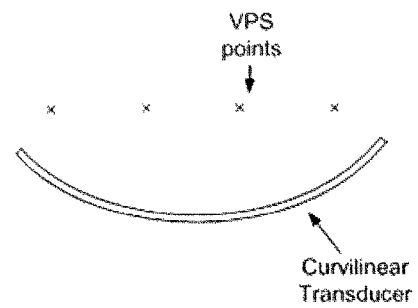
Fig. 12 A
Fig. 12 B

VIRTUAL POINT SOURCES IN ULTRASOUND IMAGING

CROSS-REFERENCE TO RELATED APPLICATIONS

This application claims priority from U.S. Application No. 61/893,140 filed 18 Oct. 2013. For purposes of the United States, this application claims the benefit under 35 U.S.C. § 119 of U.S. Application No. 61/893,140 filed 18 Oct. 2013, and entitled VIRTUAL POINT SOURCES IN ULTRASOUND IMAGING which is hereby incorporated herein by reference for all purposes.

TECHNICAL FIELD

This invention relates to the field of ultrasound imaging. Some embodiments are applicable to medical ultrasound imaging.

BACKGROUND

Ultrasound imaging is used in a wide variety of situations and has particular application in medical imaging. Great strides have been made in the quality of images provided by ultrasound imaging devices over the last 20 years however there remains room for improvement, particularly in the areas of image quality, the quality of information provided in ultrasound images and imaging frame rate.

In conventional ultrasound, a transducer with multiple elements is used to transmit and receive ultrasonic energy. Typically each element of the transducer can be controlled individually. On transmit, the timing and amplitude of each transmit pulse from each element can be controlled individually. The timing is chosen such that signals from the elements arrive at a predetermined location within the target at the same time. This process of adjusting the delays is called transmit focusing. On receive, the signals from each element are typically digitized, multiplied by a factor and summed with other elements to achieve continuous receive focusing along a line of interest.

The amplitudes of transmit pulses and/or receive pulses may be adjusted. The process of adjusting the amplitude of transmit and/or receive pulses is called apodization.

In conventional ultrasound the transmit focus is scanned to different locations in a medium being studied. The medium may, for example, comprise tissues of a human or animal. In general, the medium of interest is on one side of the transducer. This side may be called the 'front' side of the transducer. The transmit foci are placed in front of the transducer. The resolution of such conventional ultrasound images is best in the vicinity of a transmit focal point. Hence, as the receive beam is continually focused, the best resolution will occur when the receive focus is located around the transmit focal point. To improve image quality, multiple transmit focal points may be placed along a specific direction. While this can help to improve image quality, multiple transmissions come at the cost of lower frame rate as each focal point requires a separate transmission.

Synthetic aperture ultrasound imaging techniques have been investigated as an alternative to conventional techniques. In an example synthetic aperture technique, a single element is used for transmission. On receive, the data from multiple elements are digitized and stored. The process is repeated for all elements in the transducer array. The frame rate achieved in this technique is quite low and the technique is prone to motion artifacts. However, for a stationary target, an image can be formed which is continually focused in transmit and receive. Another significant disadvantage of single element synthetic aperture is that that the sensitivity is quite low—hence the depth of penetration is also typically quite low.

Some references describe the use of plane waves, unfocussed waves, weakly focused waves or divergent waves in the field of ultrasonic imaging. For example, U.S. Pat. No. 6,551,246 describes the use of plane waves with some limited discussion of unfocussed or weakly diverging and weakly focused waves. US2009/0234230, describes the use of plane waves with the addition of a "coherence enhancing step". "Synthetic Aperture tissue and flow ultrasound imaging" by Svetoslav Ivanov Nikolov [1], describes creation of diverging waves. "Synthetic Aperture Imaging for Small Scale Systems" by Karaman et. al. [2], describes transmitting with a defocussing delay profile. The transmit delay profile is chosen such that the resulting lateral response approximates the shape of a single element placed at the center of the active aperture.

There remains a need for ultrasound apparatus and methods capable of providing improved images and/or providing a cost-effective alternative to existing high quality ultrasound imaging systems.

SUMMARY

This invention has a number of aspects. Some aspects relate to methods for generating ultrasound transmissions and ultrasound imaging methods. Other aspects relate to ultrasound apparatus. Particular aspects relate to the use of virtual point sources in ultrasound transmissions. The aspects may be applied individually or in any suitable combinations.

One example aspect provides a method for transmitting ultrasound in ultrasound imaging involving selecting an aperture for transmitting ultrasound from a virtual source according to a rule. Different numbers of transducer elements may be used to transmit from different virtual sources in some embodiments. The virtual sources may be virtual point sources.

One example aspect provides a method for transmitting ultrasound from a virtual source involving selectively applying an apodization function to a subset of the transducer elements used for the virtual source. The apodization function may be selectively applied, for example, to improve image uniformity and/or to reduce artifacts resulting from uneven distributions of ultrasound energy from a virtual point source.

One example aspect provides a method for creating an imaging geometry which involves using virtual point sources spaced at different offset distances behind the face of a transducer. The geometry of the virtual point sources may differ from that of the transducer. For example, one may be curvilinear while the other is linear.

The following is a list of non-limiting enumerated example embodiments:

1. An ultrasound imaging method comprising:
    configuring transmit delays for a plurality of transducer elements of a transducer to correspond to a virtual point source located behind the transducer;
    applying an apodization function to only a subset of the plurality of transmit elements, the subset of the transmit elements being those transmit elements for which ultrasound arrival times at a reference point within a target region differ between adjacent ones of the transmit elements by less than a threshold period;

energizing the transmit elements according to the transmit delays and the apodization function to transmit ultrasound into the target region; and receiving at the transducer ultrasound energy reflected from the target region; and processing the reflected ultrasound energy to yield an image of the target region.

2. A method according to aspect 1 wherein the apodization function comprises a Hamming function.

3. A method according to aspect 1 wherein the apodization function comprises one of the following functions: Hamming, Hanning, Gaussian, cosine, Bartlett, Blackman, and Connes.

4. A method according to aspect 1 wherein the apodization function comprises a constant attenuation factor.

5. A method according to any of aspects 1 to 4 wherein the threshold period is in the range of 0.4 to 0.6 of a period of the transmitted ultrasound.

6. A method according to any one of aspects 1 to 5 wherein the reference point is at a location determined in part by a user input.

7. A method according to any one of aspects 1 to 5 wherein the reference point is at a distance away from the transducer determined by a setting of an imaging depth control.

8. A method according to any one of aspects 1 to 5 wherein the reference point is at a specified location relative to a user-selected region of interest.

9. A method according to any one of aspects 1 to 8 wherein the reference point is off of an axis extending perpendicularly to the transducer through the location of the virtual point source.

10. A method according to any one of aspects 1 to 9 comprising selecting the subset of transducer elements based in part on a frequency of the transmitted ultrasound.

11. A method according to any one of aspects 1 to 10 comprising selecting the plurality of transducer elements of the transducer based on a geometry including a location of the virtual point source relative to the transducer.

12. A method according to aspect 11 comprising selecting the plurality of transducer elements of the transducer as those transducer elements lying with an angular range of a line extending perpendicularly to the transducer from the transducer to the virtual point source.

13. A method according to aspect 11 comprising selecting the plurality of transducer elements of the transducer as those transducer elements lying with an angular range of a line extending from the virtual point source to a point in a region of interest.

14. A method according to any one of aspects 1 to 13 where the ultrasound has a frequency of at least 5 MHz.

15. A method according to any one of aspects 1 to 14 wherein the subset of the transmit elements is predetermined for an imaging geometry.

16. A method according to aspect 15 wherein the imaging geometry comprises a location of the virtual point source relative to the transducer.

17. A method according to aspect 15 or 16 wherein the imaging geometry comprises a location of a region of interest relative to the transducer.

18. A method according to any one of aspects 1 to 17 wherein the plurality of transmit elements excludes some transmit elements of the transducer.

19. A method according to any one of aspects 1 to 17 comprising selecting an aperture size based on a rule wherein the aperture size is the number of transducer elements included in the plurality of transducer elements.

20. A method according to aspect 19 wherein the rule is based one or more of the following factors:
a. the aperture size is limited by the phase difference of ultrasound wave fronts arriving at a target point;
b. the aperture size is limited by the magnitude of contribution of the elements at an arbitrarily chosen target point;
c. the aperture size is limited by the magnitude of correlation of ultrasound wavefronts emanated from each element at an arbitrarily chosen target point; and
d. the aperture size is limited by an angle originating from the emanation point.

20. A method of transmitting diverging ultrasound waves as if they were emanating from an emanation point or a set of emanation points located behind a transducer, the transducer comprising a plurality of transducer elements, wherein a size of an aperture is based on a rule and wherein the size of the aperture is a number of the transducer elements made active for a transmission.

21. A method according to aspect 20 wherein locations of one or more of the emanation points are chosen according to a rule.

22. A method according to aspect 20 or 21 wherein the rule determining the size of the aperture is based one or more of the following factors:
a. the aperture size is limited by the phase difference of the wave fronts arriving at a target point;
b. the aperture size is limited by the magnitude of contribution of the elements at a target point;
c. the aperture size is limited by the magnitude of correlation of ultrasound wavefronts emanated from the transducer at a target point;
d. the aperture size is limited by an angle subtended by the aperture relative to the emanation point.

23. A method according to aspect 21 wherein the rule determining the locations of the one or more of the emanation points is based on one or more of:
a. a geometry of the transducer; and
b. considerations of resolution and signal to noise.

24. A method according to any one of aspects 20 to 23 wherein the transducer is convex and the emanation points comprise a plurality of emanation points spaced apart from a face of the transducer and arranged in an arc.

25. A method according to any one of aspects 20 to 23 wherein the transducer is convex and the emanation points comprise a plurality of emanation points spaced apart from a face of the transducer and arranged in a straight line.

26. A method according to any one of aspects 20 to 25 where the number of emanating points is chosen according to a rule.

27. A method according to aspect 26 wherein the rule for choosing the number of emanating points comprises one or more of the following:
a. the number of emanating points is less than or equal to the number of transducer elements in the transducer;
b. the number of emanating points is chosen based on desired frame rate.

28. A method according to aspect 20 wherein the number of emanating points and the location of the emanating points are both user-configurable.

29. An ultrasound imaging apparatus comprising:
a transducer comprising a plurality of transducer elements;
a transmit circuit configured to energize the transducer elements to transmit ultrasound signals and to apply transmit delays for a plurality of the transducer elements to emulate a virtual point source located at an emanating point behind the transducer;

the transmit circuit configured to apply an apodization function to only a subset of the plurality of transmit elements, the subset of the transmit elements being those transmit elements for which ultrasound arrival times at a reference point within a target region differ between adjacent ones of the transmit elements by less than a threshold period; and a receive circuit connected to the transducer to receive signals representing ultrasound energy reflected from the target region; and a signal processing circuit configured to process the reflected ultrasound energy to yield an image of the target region.

30. Apparatus according to aspect 29 wherein the apodization function comprises a Hamming function.

31. Apparatus according to aspect 29 wherein the apodization function comprises one of the following functions: Hamming, Hanning, Gaussian, cosine, Bartlett, Blackman, and Connes.

32. Apparatus according to aspect 29 wherein the apodization function comprises a constant attenuation factor.

33. Apparatus according to any of aspects 29 to 32 wherein the threshold period is in the range of 0.4 to 0.6 of a period of the transmitted ultrasound.

34. Apparatus according to any one of aspects 29 to 33 comprising a user interface and a controller configured to establish the reference point at a location determined in part by a user input provided by way of the user interface.

35. Apparatus according to aspect 34 comprising an imaging depth control wherein the controller is configured to establish the reference point at a distance away from the transducer determined by a setting of the imaging depth control.

36. Apparatus according to aspect 34 wherein the user interface comprises a control or controls that enable selecting a region of interest and the controller is configured to establish the reference point at a specified location relative to the region of interest.

37. Apparatus according to any one of aspects 29 to 37 wherein the reference point is off of an axis extending perpendicularly to the transducer through the location of the virtual point source.

38. Apparatus according to any one of aspects 29 to 37 where the ultrasound has a frequency of at least 5 MHz.

39. Apparatus according to any one of aspects 29 to 38 wherein the subset of the transmit elements is predetermined for an imaging geometry and the apparatus comprises a data store containing data identifying the elements belonging to the predetermined subset.

40. Apparatus according to any one of aspects 29 to 39 comprising a processor configured to select an aperture size based on a rule wherein the aperture size is the number of transducer elements included in the plurality of transducer elements.

41. Apparatus according to aspect 40 wherein the rule is based one or more of the following factors:
a. the aperture size is limited by the phase difference of ultrasound wave fronts arriving at a target point;
b. the aperture size is limited by the magnitude of contribution of the elements at an arbitrarily chosen target point;
c. the aperture size is limited by the magnitude of correlation of ultrasound wavefronts emanated from each element at an arbitrarily chosen target point; and
d. the aperture size is limited by an angle originating from the emanation point.

42. Apparatus of transmitting diverging ultrasound waves as if they were emanating from an emanation point or a set of emanation points located behind a transducer, the transducer comprising a plurality of transducer elements, wherein the apparatus comprises a processor configured to determine a size of an aperture based on a rule and wherein the size of the aperture is a number of the transducer elements made active for a transmission.

43. Apparatus according to aspect 42 wherein the processor is configured to determine locations of one or more of the emanation points according to a rule.

44. Apparatus according to aspect 42 or 43 wherein the rule determining the size of the aperture is based one or more of the following factors:
a. the aperture size is limited by the phase difference of the wave fronts arriving at a target point;
b. the aperture size is limited by the magnitude of contribution of the elements at a target point;
c. the aperture size is limited by the magnitude of correlation of ultrasound wavefronts emanated from the transducer at a target point;
d. the aperture size is limited by an angle subtended by the aperture relative to the emanation point.

45. Apparatus according to aspect 43 wherein the rule determining the locations of the one or more of the emanation points is based on one or more of:
a. a geometry of the transducer; and
b. considerations of resolution and signal to noise.

46. Apparatus according to any one of aspects 42 to 45 wherein the transducer is convex and the emanation points comprise a plurality of emanation points spaced apart from a face of the transducer and arranged in an arc.

47. Apparatus according to any one of aspects 42 to 45 wherein the transducer is convex and the emanation points comprise a plurality of emanation points spaced apart from a face of the transducer and arranged in a straight line.

48. Apparatus according to any one of aspects 42 to 47 wherein the processor is configured to select a number of the emanating points according to a rule.

49. Apparatus according to aspect 48 wherein the rule for choosing the number of emanating points comprises one or more of the following:
a. the number of emanating points is less than or equal to the number of transducer elements in the transducer;
b. the number of emanating points is chosen based on desired frame rate.

50. Apparatus according to aspect 42 comprising a user interface wherein the number of emanating points and the locations of the emanating points are both user-configurable by way of the user interface.

51. A method comprising any new and inventive step, act, combination of steps and/or acts or subcombination of steps and/or acts as described herein.

52. Apparatus comprising any new and inventive feature, combination of features or subcombination of features as described herein.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIGS. 12A and 12B illustrates how various imaging formats can be realized with different arrangements of virtual point sources.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

One aspect of the invention relates to methods and apparatus for generating ultrasound transmissions. Such ultrasound transmissions may be used in synthetic aperture ultrasound methods but may also have other applications.

A disadvantage of synthetic aperture methods in which transmissions originate from a single transducer element can be remediated by generating transmissions using virtual point sources. In this technique, transmissions are made using multiple transducer elements. The timing at which a pulse is transmitted by different ones of the transducer elements is arranged such that the wavefront resulting from the transmission of a pulse (or other waveform) by a group of transmitting transducer elements appears to originate at a point behind the transducer. The point behind the transducer from which the waves appear to originate may be called a virtual source. The idea behind using virtual sources is that the transmitted waveform can closely approximate the waveform that would result from a transmission originating at a single transducer element at the location of the virtual source.

Virtual sources may be used as acoustic sources in place of single-elements in synthetic aperture ultrasound. The same principles used to process acoustic data in single-element synthetic aperture ultrasound may be applied to processing received ultrasound except now multiple physical elements are utilized to form the transmitted ultrasound. Consequently, the transmitted ultrasound may carry significantly more energy than would be practical for a transmission from a single transducer element. The utilization of multiple physical elements to generate transmitted ultrasound can make the sensitivity larger than could be achieved from a true single element transmission.

Figure 1:
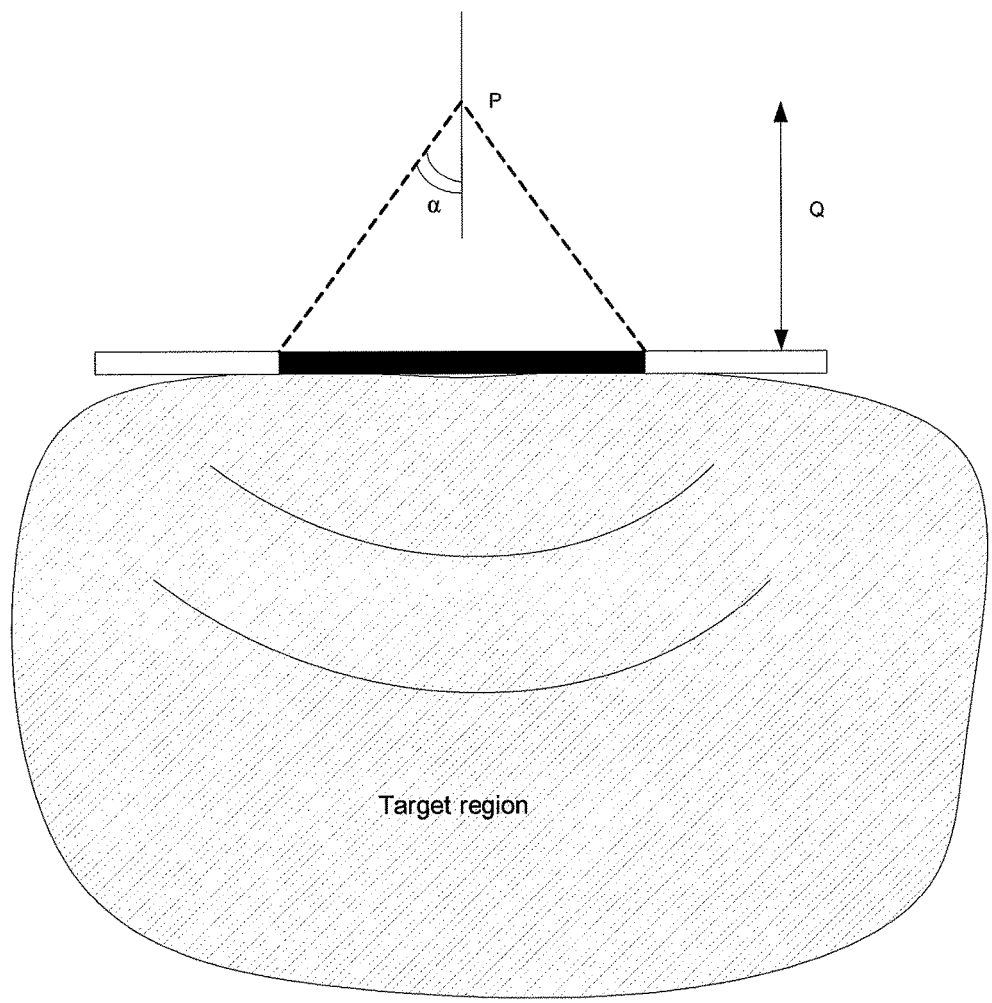
FIG. 1 shows the concept of a virtual point source where waves appear to emanate from point P during transmission.

However, virtual sources and diverging waves exhibit anomalous behavior which may limit the usefulness of this technique. FIG. 1 shows a 128 element, 40 mm transducer comprising an array of transducer elements with a virtual source location P placed Q units of distance behind the transducer. In this example, the transmit aperture is limited such that only elements within an angle α of a perpendicular line from the virtual source to the transducer are included in the transmit aperture. Other transducer elements are not used to generate the transmitted ultrasound. The area in which transducer elements are included is shown in black in FIG. 1.

In FIG. 1, the transducer is shown on top of a target region which is being imaged or scanned. Shown within the target region are two arcs which indicate wavefronts of an ideal wave emanating from point P, assuming P is a point source.

Ideally the sensitivity of an ultrasound system using a virtual point source such as a virtual source at point P would be the same for all points along an arc centered on P. If one plotted received ultrasound energy as a function of angle at points along such an arc (as would be measured by a hydrophone within the target region) then ideally the plot would be a straight line. However the actual response is far from ideal. Variations with received ultrasound energy with position along such an arc will lead to artifacts in the image if corrections are not made.

Figure 2:
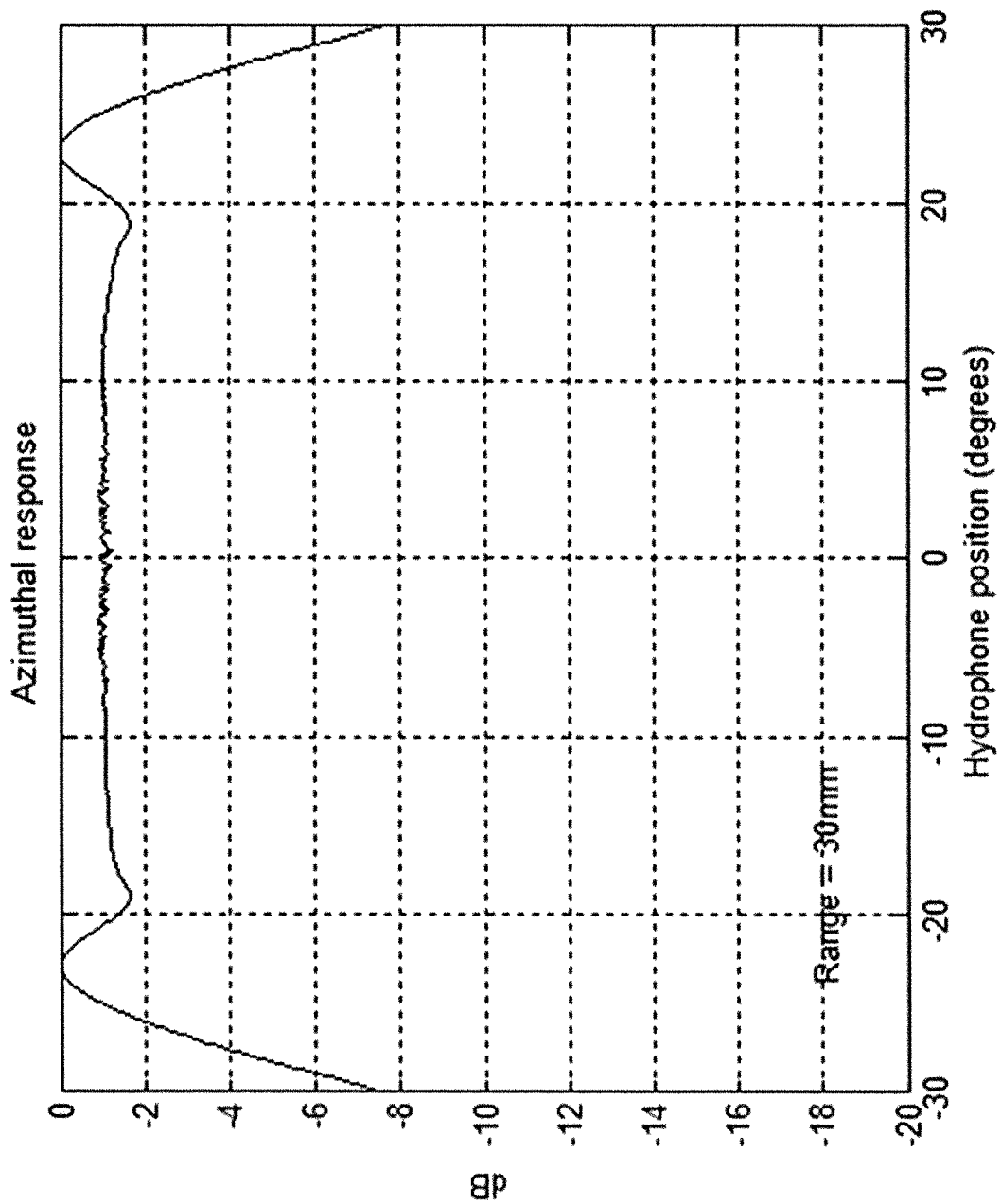
FIG. 2 shows the azimuthal point spread function for a virtual source placed at point P behind a transducer.

FIG. 2 shows the azimuthal response obtained from the transducer specified above and illustrated in FIG. 1. The angle α in FIG. 1 is 30°. It is important to note that the x-axis denotes the hydrophone position as measured in an arc subtended by the point P. For this example, Q was set to 10 mm.

It can be seen from FIG. 2 that the response is not ideal with increased energy towards the edges of the response. These increased lobes of energy may cause artifacts in the image such as increased clutter and uneven gain in the image. Image quality could be improved by altering the ultrasound transmission in a way that results in the illustrated lobes being reduced without affecting the central part of the response in any significant manner.

Figure 3:
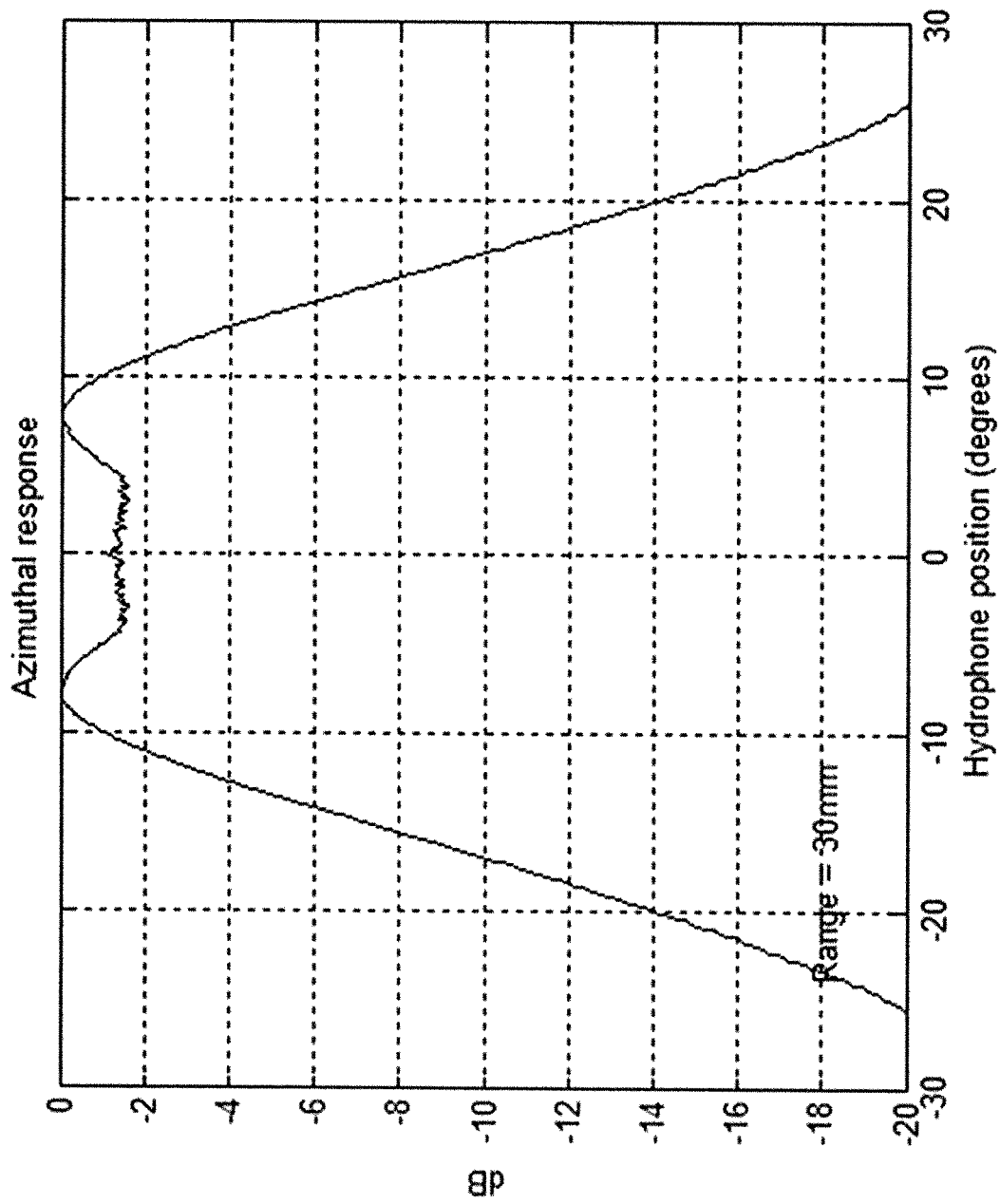
FIG. 3 shows the azimuthal point spread function for the same virtual source placed at point P as in FIG. 2 however the angle α is half of that set in FIG. 2.

FIG. 3 shows the response along an arc centered at P for a setup identical to FIG. 1 except that the aperture is defined by an angle α of 15° instead of 30°. All other parameters are the same such that FIG. 3 and FIG. 2 are directly comparable. The effect of setting α to 15° is a smaller aperture and yet comparison of FIG. 3 to FIG. 2 clearly demonstrates the increased lobe levels towards the edges of the response.

Figure 4:
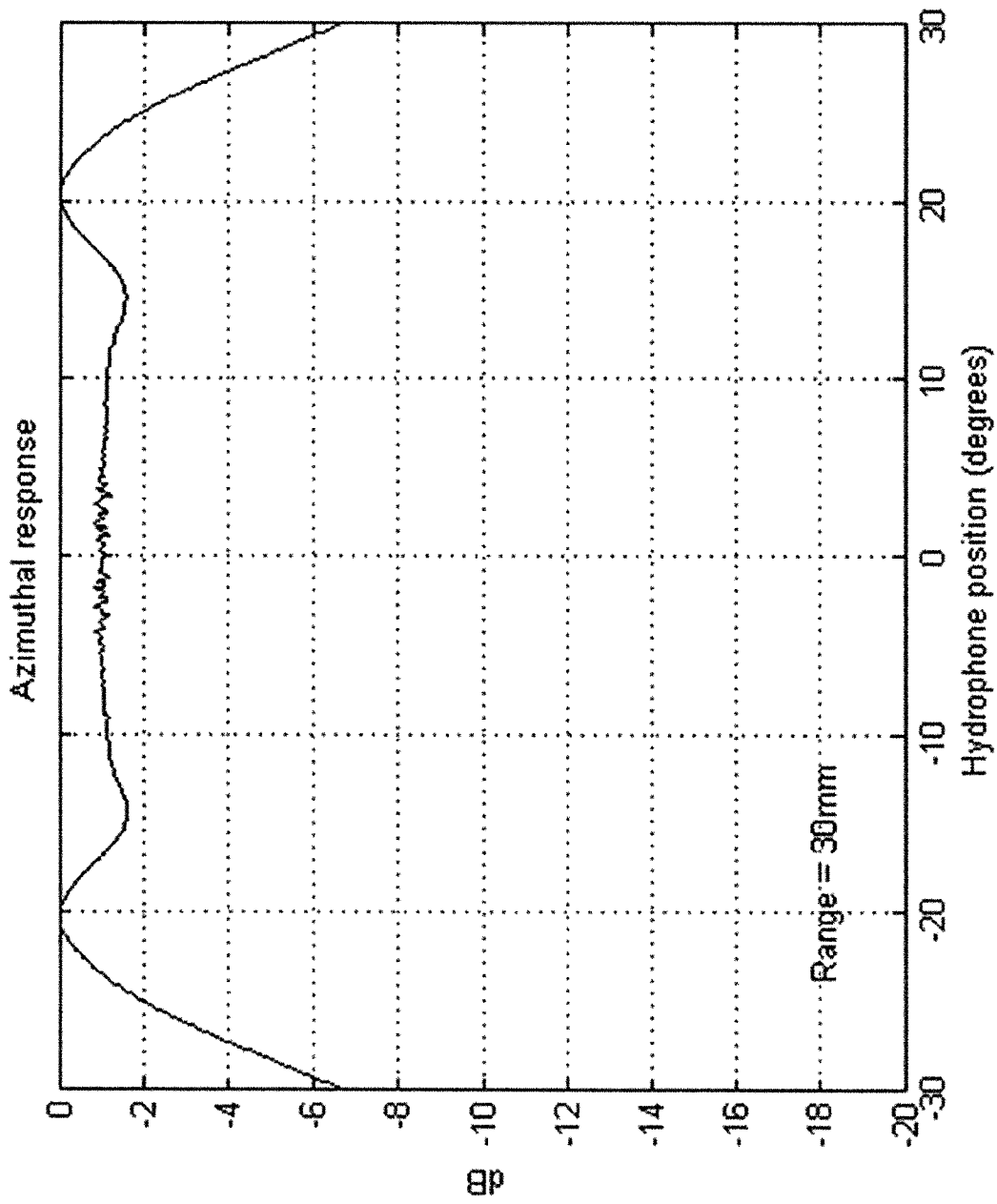
FIG. 4 shows the azimuthal point spread function for the virtual source placed at half the distance from the transducer as in FIG. 2 but with the angle α being identical to that illustrated by FIG. 2.

FIG. 4 shows yet another situation where the parameter Q is set to 5 mm but the angle α is at 30°. The azimuthal response continues to demonstrate increased lobe levels.

Figure 5:
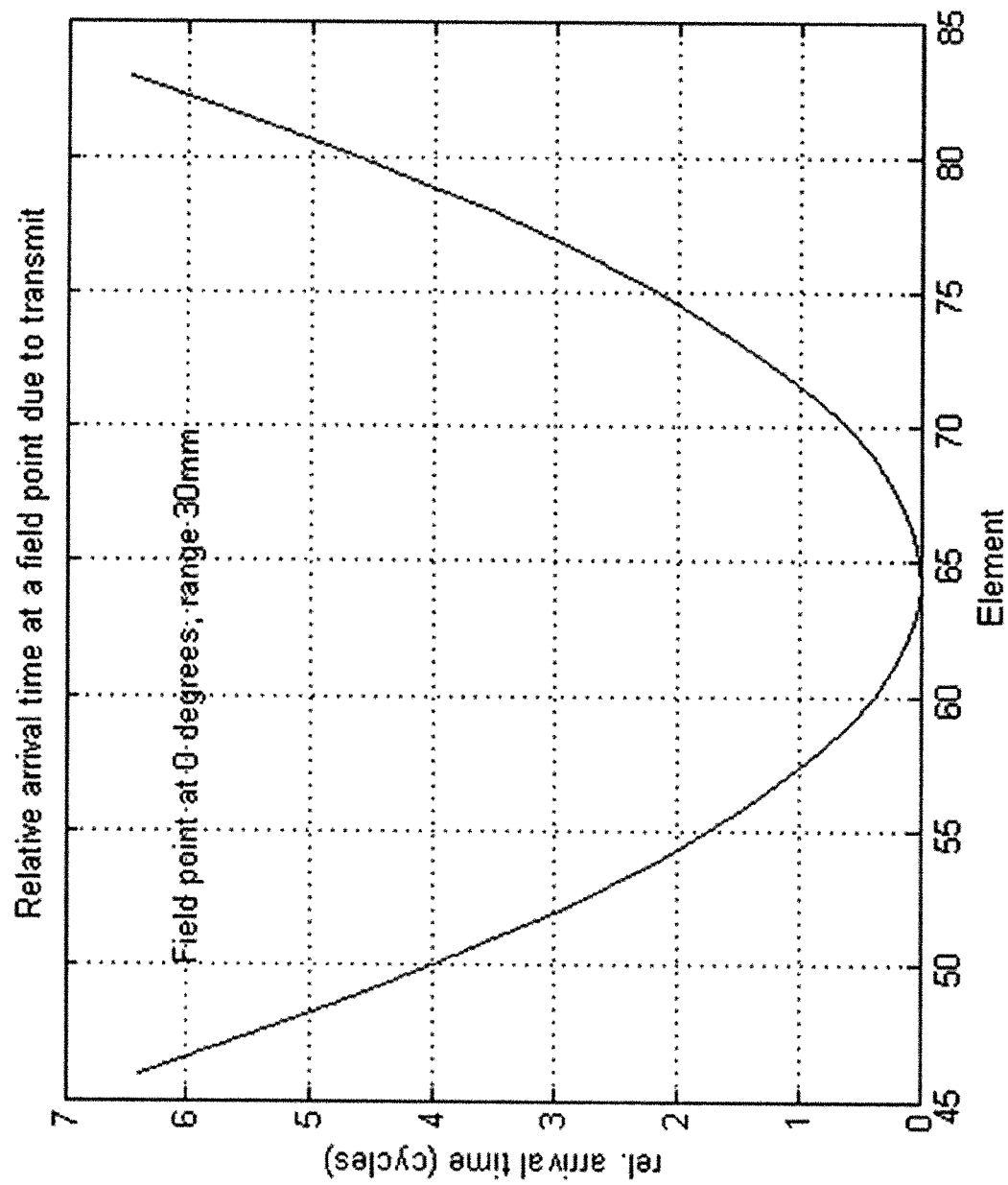
FIG. 5 shows the arrival times of the energy from various elements for the situation in FIG. 2. The hydrophone position for this example was 0°.

To investigate the reason why these lobes of energy appear, the arrival times of the transmissions from each of the elements were simulated at multiple points along the hydrophone path. FIG. 5, shows the arrival times for the case of FIG. 2 where the parameter Q is set to 10 mm and the angle α to 30° and where the observation point is at hydrophone position 0°. FIG. 5 shows that at 0 degrees (corresponding to the center of FIG. 2) there is a symmetrical progression of arrival times (shown as relative number of cycles from the element associated with the minimum arrival time). In contrast, FIG. 6 shows the relative arrival times at the hydrophone position of −23 degrees where in FIG. 2, there is a large lobe of energy.

Figure 6:
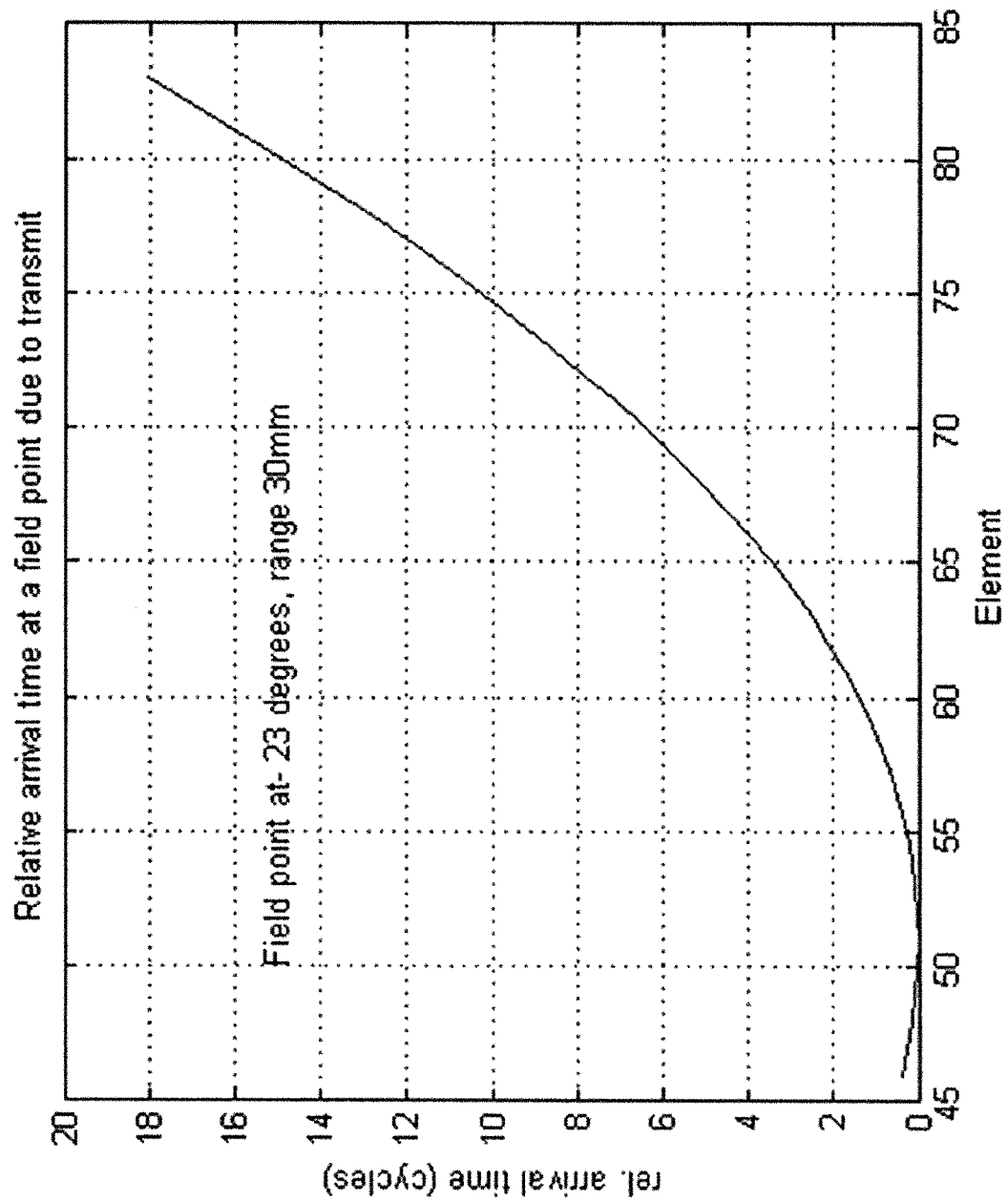
FIG. 6 shows the arrival times of the energy from various elements for the situation in FIG. 2. The hydrophone position for this example was 23°.
Figure 7:
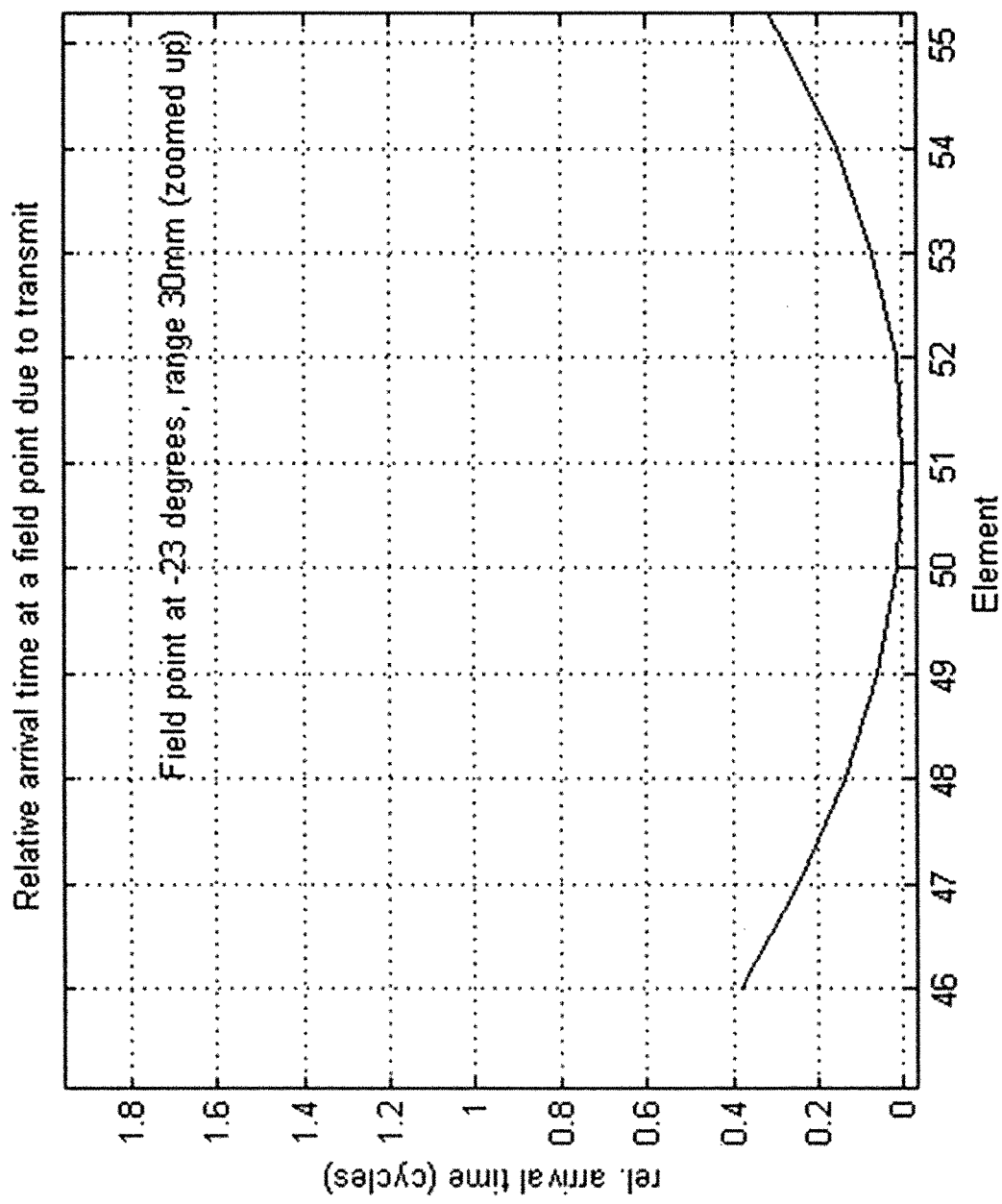
FIG. 7 shows a magnified portion of the graph of FIG. 6.

In contrast to FIG. 5, the arrival time graph of FIG. 6 is not symmetrical. There is a more critical observation to make about FIG. 6. Ultrasound from transducer elements numbered lower than about element 51 (the transducer elements are numbered sequentially for reference starting at one side of the transducer) exhibit arrival times that differ by less than ½ wavelength. This is more obvious in FIG. 7, where the bottom portion of FIG. 6 is shown zoomed in. The significance of this observation is that the energy from elements associated with arrival times which differ by less than ½ wavelength constructively interfere. This constructive interference tends to cause the large lobes of energy. For observation points where the arrival times of the energy from different elements are less than 1 wavelength away as an example, constructive and destructive interference occurs. This prevents the occurrence of the lobes of energy.

While the inventor does not wish to be bound by any particular theory of operation, the inventor has observed that if an observation point has energy with arrival times such that ultrasound from a predominant number of transducer elements constructively interferes then a lobe of energy will occur at the observation point. If the observation point is such that significant constructive and destructive interference both occur, the lobe of energy will be reduced or not occur.

Lobes as shown for example in FIGS. 2 and 3 may be reduced or eliminated by applying a suitable apodization profile to the transmit elements. The apodization profile may be designed such that the lobes are reduced to yield a close to ideal azimuthal response.

Figure 8:
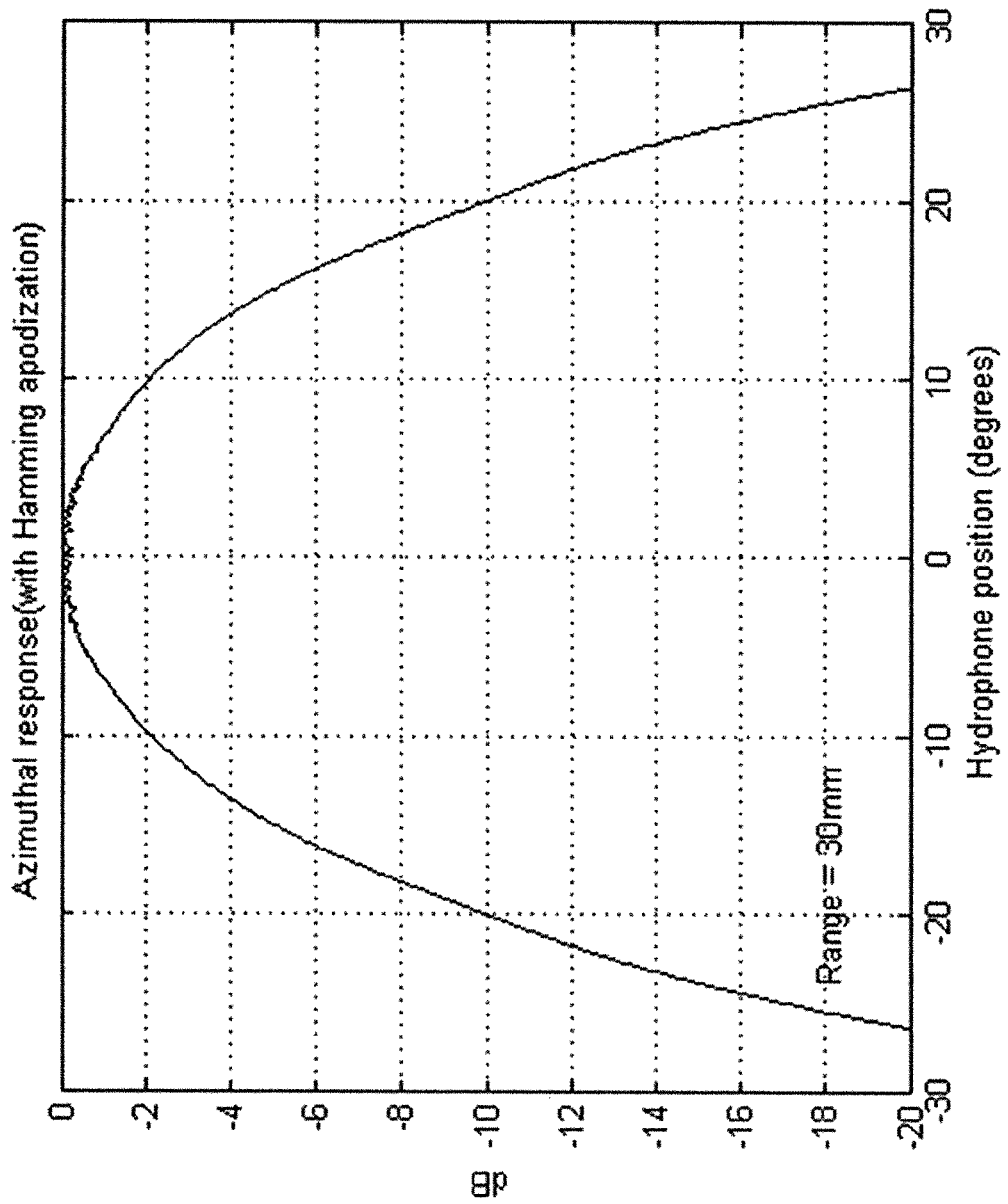
FIG. 8 shows the azimuthal response for the situation in shown in FIG. 2 except a Hamming apodization has been applied to the entire active array.

FIG. 8 demonstrates the transmit-only azimuthal response for the situation in FIG. 2 except that a Hamming apodization is applied to the entire active array. It is clear that the lobes of energy are no longer an issue however the response is far from the ideal response of a straight line. This type of apodization is useful in conventional imaging techniques when a transmit focus is placed in front of the transducer.

Figure 9:
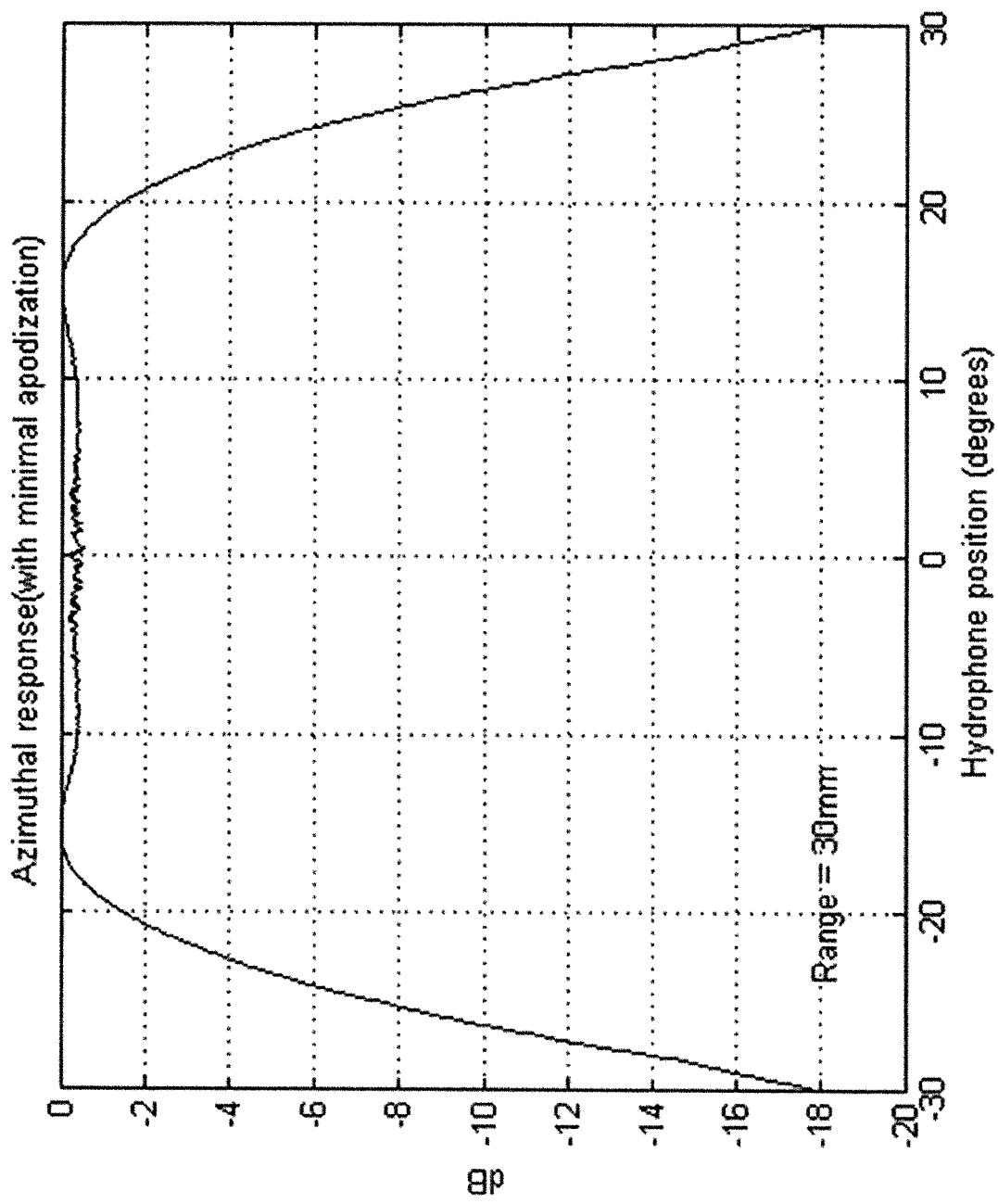
FIG. 9 shows the azimuthal response for the situation in shown in FIG. 2 except minimal apodization is used to preserve the response and reduce the lobes.

FIG. 9 demonstrates a transmit only azimuthal response for the situation in FIG. 2 except that apodization has been applied only to those transducer elements that contribute to the lobes of energy. By examining FIG. 7, if elements 46 through 51 for example had an apodization profile applied to them, then the possibility of retaining the substantially ideal response remains with the advantage of low lobe energy. FIG. 9 demonstrates that this indeed is the case. In FIG. 9 a Hamming apodization profile was applied only to these elements identified as those that contribute to the increased lobes 9 (i.e. elements 46 to 51). It can be seen in FIG. 9 that the azimuthal response is closer to the ideal response.

The number and the specific elements to apodize may vary by frequency and region of interest. For example if the target is placed far away from the transducer, then it may not be necessary to apodize at all. If the target is close to the transducer, a larger number of elements may need to be apodized. The location of the virtual point source relative to the transducer can also affect the number and the specific elements to apodize for best results. Some embodiments perform processing to identify groups of elements within the aperture for which the emitted ultrasound tends to predominantly constructively interfere at a reference location in the imaging volume when a virtual point source ultrasound signal is generated.

Various thresholds may be applied to determine which elements of a transmit aperture to apply an apodization function to. In some embodiments the threshold considers the arrival times of ultrasound energy from different elements of the aperture at an observation point and selects for apodisation those elements for which the arrival times of the energy from different elements at the observation point differ by less than ½ of one period of a chosen frequency representative of the ultrasound (such as the center frequency or dominant frequency of the transmitted ultrasound). In some embodiments the threshold is in the range of 0.4 to 0.6 or 0.35 to 0.65 of one period of a signal at the center frequency of the transmitted ultrasound. An apodization function can then be applied to those elements in the aperture for which the ultrasound energy arrives at the observation point at arrival times separated by less than the threshold and not applied to other elements.

Apodization may be applied in various ways. As an example, the transmission delay profile may be precalculated and stored prior to a live imaging operation. The apodization may be precalculated or it may be calculated within a processor of an imaging system when live imaging commences.

An example embodiment performs a method comprising:

obtaining an imaging geometry (virtual point source position and target region)—the geometry may be predefined, selectable by a user using a suitable user interface etc.

optionally selecting an aperture (a subset of transducer elements to use for the geometry)—this may be done, for example, by identifying transducer elements within an angular range of a line from the virtual point source perpendicular to the transducer or a line between the virtual point source and a center of the region of interest etc.

determining transmission times (delays) for transmitting an ultrasound waveform for each of the transducer elements included within the aperture to cause ultrasound having a wavefront that appears to emanate from the virtual point source.

determining arrival times at a point within the region of interest that is off-axis (e.g. a point corresponding to a lobe).

identifying a subset of the transducer elements in the transmit aperture for which transmitted ultrasound will tend to constructively interfere—e.g. transmit elements for which the arrival times differ by less than a threshold amount (e.g. a difference in arrival times corresponding to less than ½ wavelength—e.g. ½ of a period—of the transmitted ultrasound). For example, if the transmitted ultrasound has a frequency of 10 MHz which corresponds to a period of 100 ns then the subset of transducer elements may be transducer elements for which the arrival times at the point within the region of interest differ from one another by a time of less than 50 ns (or some other time threshold in the range of about ¼ or slightly less than ¼ to slightly more than ½ of the period of the ultrasound).

applying an apodization function to the subset of the transducer elements in the aperture (and not applying the apodization function to at least some other transducer elements in the aperture). Various apodization functions may be used. A Hamming apodization function is one example. Other examples are Hanning, Gaussian, cosine, Bartlett, Blackman, Connes, etc.

Such apodization functions may be applied to transducer elements in an identified subset of the transducer elements which make up an aperture. The subset may be at one end of the aperture (e.g. may include the last transducer element at one end of the aperture and a plurality of other transducer elements contiguous to the end transducer element). In this case, the apodization function may be applied, for example, by scaling that portion of the apodization function on one side of a maximum of the apodization function in the 'x' direction (where the transducer elements are spaced apart in the x direction) so that the minimum of the apodization function corresponds to the transducer element at the end of the aperture or a transducer element adjacent to the end transducer element but outside of the aperture and so that the maximum of the scaled part of the apodization function corresponds to a transducer element within the aperture that is near the boundary of between the subset and the rest of the elements of the aperture (e.g. to a transducer element that is adjacent to but not included in the subset).

In a very simple embodiment, applying the apodization function to the selected elements may comprise attenuating the selected elements by a constant factor (e.g. ½). In some such embodiments the factor is in the range of 0.3 to 0.7. In another example embodiment the selected elements are attenuated by factors which vary monotonically from an end element of the aperture, which is most-highly attenuated to a selected transducer element that is adjacent to a non-selected transducer element which is least attenuated. The monotonic variation of the attenuation factors applied to the selected transducer elements may vary in a linear manner or in a non-linear manner. In an example embodiment the selected elements are attenuated by factors which vary according to a monotonically increasing function (e.g. $\cos \theta$ for $-\pi/2 \leq \theta \leq 0$) from an end element of the aperture, which is most-highly attenuated, to a selected transducer element at or near a boundary between the selected transducer elements and other non-selected transducer elements in the aperture (e.g. a transducer element that is adjacent to a non-selected transducer element which is least attenuated).

It is not mandatory that the apodization function leaves completely unchanged the transmit amplitudes for those transducer elements in the aperture that are not included in the selected elements. In some embodiments, the apodization function is applied to all transducer elements in the aperture or to some transducer elements in the aperture that are not included in the selected elements. In such cases the apodization function may be asymmetrical and may be designed such that the average amount of attenuation applied per element for those elements that are included in the selected elements is significantly greater than the average amount of attenuation applied to those elements in the aperture that are not included in the selected elements. For example, the average amount of attenuation applied to the selected elements may be 1.4 or more times larger (2 or more times the attenuation in some embodiments) than the average attenuation applied by the apodization function to the elements not included in the selected elements. Such an apodization function may have a knee point that coincides with the boundary between the selected elements and the rest of the elements in the aperture such that the transmit amplitudes of the selected elements fall off going toward the end of the aperture from the knee point and transmit amplitudes of the non-selected elements in the aperture either do not fall off or fall off only slightly moving away from the knee point in the other direction away from the end of the aperture at which the selected elements are located.

In some embodiments the observation or reference point that is used to identify the subset of the transmit elements to be subjected to apodization is selected at least in part based on a user input. For example, in some embodiments:

the reference point is selected to have a distance from the transducer that is variable and depends on a setting of a depth control by a user;

the reference point is located off-axis by an amount determined by a setting of an image width control and/or a depth control;

the reference point is located within a user-selected region of interest (ROI)—for example, the reference point may be centered in the ROI or at a point within the ROI that is most off-axis;

the reference point is located at a position that is off-axis by a given angle or by a given amount and at a depth based on a setting of a user control (e.g. an imaging depth control).

the reference point is located at one of a number of predefined locations that is selected by actuating a user control.

In some embodiments, selection of those transducer elements to subject to apodization is made based on estimated arrival times of ultrasound energy at each of a plurality of reference points within an area to be imaged. The plurality of reference points may, for example, be selected to be points which are most off-axis in a volume to be imaged. Transducer elements for which ultrasound arrival times at any of the reference points satisfy criteria as discussed above may be included in the subset of transducer elements to which apodization is applied.

In some embodiments, the subset of the transducer elements is pre-identified for one or more imaging geometries. In such embodiments it is not necessary to determine arrival times in order to select the subset of elements to which the apodization function is to be applied. In such embodiments, upon selection of a particular imaging geometry the corresponding subset of transducer elements to which the apodization function is to be applied is retrieved from a data store.

Now, another aspect of the invention is discussed. The aspects of the invention discussed below may be applied in conjunction with those aspects discussed above but also have independent application.

In order to make images with the transmission schemes discussed above, a set of transmissions ranging from one to several is needed. In some state-of-the art techniques, ultrasound beams are transmitted into a target region. The direction of the beams is varied as the beams scan the target region. On receive, reflected ultrasound energy is detected by the transducer, after which each channel is appropriately delayed and summed to form receive beams.

In different embodiments, different rules may be applied to determine factors such as which transducer elements are used to transmit ultrasound for a given virtual point source location, to which transducer elements should an apodization function be applied, where should virtual point sources be located for a given imaging situation, how many virtual point sources ought to be used etc.

For example, determining the size of the aperture to be used for a given virtual point source may be based one or multiple of the following factors:

The aperture size is limited by the phase difference of the wave fronts arriving at an arbitrarily chosen target point The aperture size is limited by the magnitude of contribution of the elements at an arbitrarily chosen target point The aperture size is limited by the magnitude of correlation of the wavefronts emanated from each elements at an arbitrarily chosen target point The aperture size is limited by an angle originating from the emanation point.

The aperture size is limited by the amount of axial artifact combinations of any two or more of the above.

As another example, a rule determining the location of the emanating point or points is based on one or multiple of the following factors:

The location of the emanating point is based on the geometry of the physical transducer (as a non-limiting example the location of the emanation points is based on a fixed or arbitrary geometrical rule in relation to the actual physical elements.

The location of the emanating point is based on considerations of resolution and signal to noise.

a combination of the above.

For example, where a transducer array is convex, emanation points (virtual point sources) may be arranged in a an arc with the same or different radius of curvature as the array or. Where an array of transducer elements is linear or planar a set of emanation points may be arranged in a linear or curvilinear manner.

As another example, the number of emanating points (virtual point sources) may be chosen according to a rule which may, for example, comprise one or more of:

The number of emanating points is less than or equal to the number of physical elements The number of emanating points is chosen based on desired frame rate The number of emanating points is chosen based on geometry (e.g. an offset of the emanating points behind a transducer and a region of interest to be imaged).

combinations of the above.

Some embodiments provide automatic selection of one or more of the above parameters based on rules such as those described above which may, for example, be applied by a data processor executing software instructions. Some embodiments provide user control of one or more of the above parameters by way of a suitable user interface. Some embodiments provide assisted user control wherein a user can set one or more parameters and a system automatically sets other parameters based at least in part on the user-selected parameters.

Figure 10:
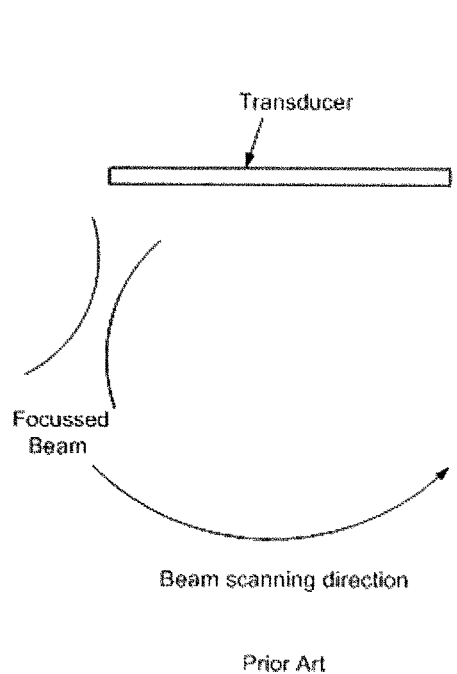
FIGS. 10A and 10B are schematic views illustrating differences between prior art ultrasound transmissions and innovative diverging waves disclosed in this application.
Figure 10:
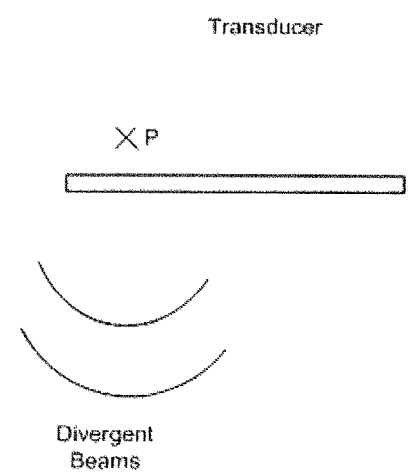

FIGS. 10A and 10B illustrate the difference between conventional focused scanned ultrasound beams and transmission schemes involving diverging waves from point sources or virtual point sources. In FIG. 10A, a conventional style of ultrasound transmissions is shown. In FIG. 10B, diverging waves are shown apparently emanating from the side of the array from point P. Point P is called a virtual source because energy apparently emanates from this point. The number and location of the point sources are two critical parameters.

Figure 11:
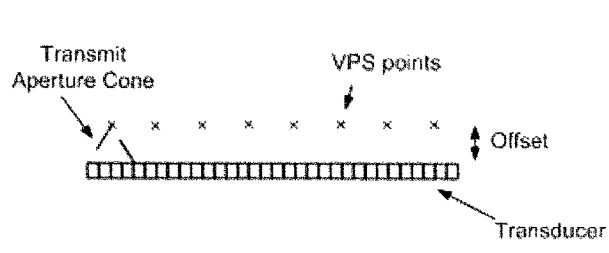
FIGS. 11A and 11B illustrate two different example ways for arranging virtual point sources.
Figure 11:
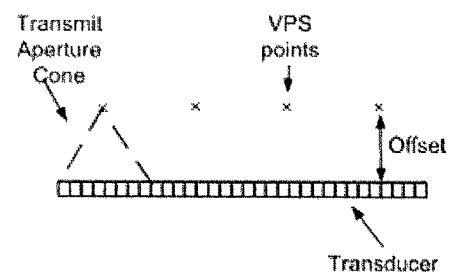

In one aspect of the invention, the number of virtual sources is equal to or less than the number of elements in a transducer array. Each case has a unique advantage. For example, in the case when the number of virtual sources is less than the number of elements, one advantage is that the frame rate may be high. Typically in a 128 element linear array, 128 or 256 transmit beams are fired and the same number of receive beams are generated. With the diverging beams described herein, fewer transmissions may be needed as each beam covers a broad area with the subsequent improvement in resolution occurring due to the combination of data from each channel. FIGS. 11A and 11B show two situations when the number of virtual sources is less that the number of transducer elements. In this example a transducer with 32 elements is shown. In FIG. 11A, the number of Virtual Point Sources (VPS) is shown to be 8 and each VPS is associated with 4 elements shown by the dotted lines in the Figure. In FIG. 11B, only 4 VPS locations are shown and each VPS is associated with 8 elements. In FIG. 11B, the Offset (i.e. location of VPS behind the transducer is shown to be larger than the Offset in FIG. 11A). In FIG. 11A, a total of 8 transmissions are needed to cover the width of the transducer whereas in FIG. 11B a total of 4 transmissions are needed. In either case, this is far fewer than 32 or 64 transmissions that would be typical using prior art beamformed imaging techniques.

An advantage of the use of divergent beams is that the frame rate with the divergent beam style of transmissions can be greater than the state-of-the-art type of transmission style. The offset, the number of transmit elements per VPS location and the number of VPS sources are input design parameters which may be adjusted according to the desired frame rate, resolution achieved and the signal to noise ratio for each situation. The adjustment may be a user adjustable or programmed as part of an initialization sequence.

Yet another aspect of the invention is now described with reference to FIG. 12. Various formats of imaging are known in the prior art. For example, with linear arrays, typical formats are linear and trapezoid formats. With a curvilinear transducer, typical formats are curvilinear in nature. With a phased array, a linear transducer with $\lambda/2$ spacing, the imaging formats are typically fan shaped. These formats are intricately tied to the shape of the transducer. However an ultrasound system that can transmit diverging waves as described in this disclosure, may be capable of operation to provide VPS sources at arbitrary locations that are not dependent on the geometry of the transducer.

As an example in FIG. 12A, a set of VPS sources is chosen in an arc behind a linear array. The offsets in this example are variable as opposed to the constant offset in the example in FIG. 11. In FIG. 12B, a set of VPS sources are chosen in a linear format behind a curved array. The choice of these imaging formats may be based on viewing angle desired, familiarity of imaging formats etc.

The aspects described above may be applied individually or in any combination. Ultrasound apparatus may be configured by way of software, configurable logic, hardwired logic or the like to provide functionality as described above.

Figure 13:
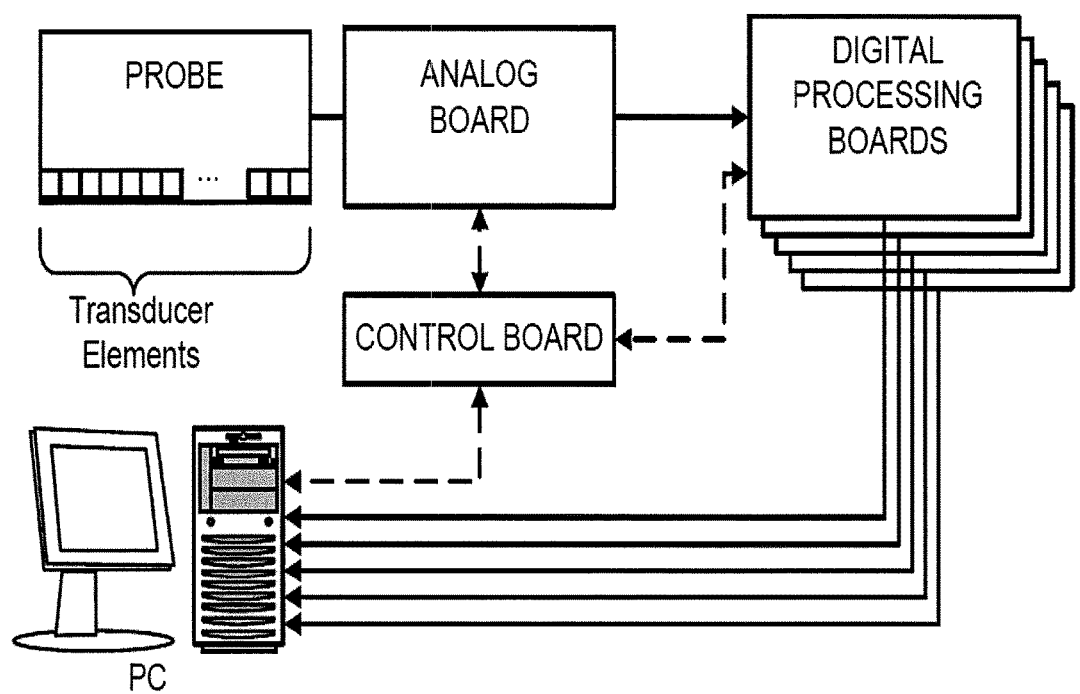
FIG. 13 shows a non-limiting example ultrasound system.

In a non-limiting example embodiment an ultrasound system operates using "pixel-based" methods. FIG. 13 shows an illustrative example of such a system. The system uses an ultrasound transducer that is made up of a number of transducer elements. The transducer elements can be driven to transmit ultrasound into a subject. The transducer may be one-dimensional (i.e. have a single straight or curved line of transducer elements) or two-dimensional (i.e. have an array of transducer elements arranged in two dimensions with transducer elements at different positions in each of the dimensions).

A probe which includes the transducer elements is connected to an analog circuit board by a cable. A separate transmitter and a separate receiver may be provided for each transducer element although this is not mandatory. Providing separate transmitters and receivers avoids the need for switches to multiplex the transducer elements to a smaller number of transmitters/receivers. Signals received at the receivers are digitized. A separate analog-to-digital converter (ADC) is optionally but advantageously provided for each channel. The digitized signals are provided to several digital processing boards. A control circuit board coordinates the acquisition and processing of ultrasound data. Each of the digital processing boards includes a field-programmable gate array (FPGA) and local memory. The FPGAs are configured to process the digitized signals to yield image data. The image data is delivered to a computer for viewing.

The transducer elements are driven to operate as virtual point sources as described herein. The virtual point sources are achieved by operating groups of transducer elements together to provide a virtual point source. When the elements are operated together to provide a virtual point source, transmissions from the elements are timed to produce a spherical wavefront centered at the location of the virtual point source. The location of the virtual point source does not need to coincide with the location of any transducer element. For example, transducer elements may be controlled to provide a virtual point source located behind the transducer elements.

In an example mode of operation the system transmits using each of a number of virtual point sources and, after each point source firing, the system receives echo signals on all transducer elements. These echo signals are digitized and stored. The echo signals are filtered. This process may be repeated for any number of point source transmissions.

The collected data may be stored in a three-dimensional array. One dimension corresponds to the point source from which the ultrasound was emitted, one dimension corresponds to the transducer element at which the ultrasound was received, and one dimension corresponds to time.

Images may be constructed by, for each of a number of pixels at predetermined locations in the subject, selecting from the collected data array those values that correspond to the pixel. These values are summed to yield a pixel value corresponding to the pixel. This process of selecting and summing is repeated for each pixel. In general, a large number of raw data values (e.g. 128×128 values) will correspond to each pixel. It is not necessary to use all of these raw data values. In some cases, the system may select which values to use for each pixel based upon criteria which define a subset of the transmitter/receiver pairs to be used for the pixel.

A focus map may be used to identify those elements of the raw data which correspond to each pixel. The focus map may be provided by two tables. One table indicates the distances to the pixel (expressed as a number of samples) from each point source used to transmit the ultrasound. Another table indicates the distances (again expressed as a number of samples) from the pixel to each transducer element that may receive an echo signal from that pixel.

The following references are incorporated herein by reference for all purposes:
 [1] "Synthetic Aperture tissue and flow ultrasound imaging" by Svetoslav Ivanov Nikolov, Ph. D Dissertation Aug. 31, 2001
 [2] "Synthetic Aperture Imaging for Small Scale Systems" by Mustafa Karaman et. al., IEEE Transactions on Ultrasonics, Ferroelectrics and Frequency Control, Vol 42, No 3, May 1995
 [3] "Method and Apparatus for forming medical ultrasound images" by Ustuner et. al, U.S. Pat. No. 6,551,246, Issued April 2003

Interpretation of Terms

Unless the context clearly requires otherwise, throughout the description and the claims:
 "comprise", "comprising", and the like are to be construed in an inclusive sense, as opposed to an exclusive or exhaustive sense; that is to say, in the sense of "including, but not limited to";
 "connected", "coupled", or any variant thereof, means any connection or coupling, either direct or indirect, between two or more elements; the coupling or connection between the elements can be physical, logical, or a combination thereof;
 "herein", "above", "below", and words of similar import, when used to describe this specification, shall refer to this specification as a whole, and not to any particular portions of this specification;
 "or", in reference to a list of two or more items, covers all of the following interpretations of the word: any of the items in the list, all of the items in the list, and any combination of the items in the list;
 the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes steps or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. An ultrasound imaging method comprising:
configuring transmit delays for an array of transducer elements of a transducer to correspond to a virtual point source located behind the transducer relative to a target region located in front of the transducer;
applying an apodization function to only a subset of the array of transducer elements, the subset of the array of transducer elements comprising a plurality of adjacent transducer elements determined to have ultrasound signal arrival times at a reference point within the target region that differ by less than a preselected threshold period;
energizing the array of transducer elements according to the transmit delays and the apodization function to transmit ultrasound signals into the target region; and
receiving at the transducer ultrasound signals reflected from the target region; and
processing the reflected ultrasound signals to yield an image of the target region.

2. A method according to claim 1, wherein a center of the plurality of adjacent transducer elements is offset from an axis formed by a line perpendicular to the array of transducer elements and intersecting the virtual point source.

3. A method according to claim 1 wherein the apodization function comprises one of the following functions: Hamming, Hanning, Gaussian, cosine, Bartlett, Blackman, and Connes.

4. A method according to claim 1, wherein the apodization function comprises a linear attenuation factor.

5. A method according to claim 1, wherein the preselected threshold period is in the range of 0.4 to 0.6 of a period of the transmitted ultrasound signals.

6. A method according to claim 1 wherein the reference point is at a location determined in part by a user input.

7. A method according to claim 1 wherein the reference point is at a distance away from the transducer determined by a setting of an imaging depth control.

8. A method according to claim 1 wherein the reference point is at a specified location relative to a user-selected region of interest.

9. A method according to claim 1, wherein the reference point is offset from a line extending perpendicularly to the transducer through a location of the virtual point source.

10. A method according to claim 1, further comprising selecting the subset of the array of transducer elements based in part on a frequency of the transmitted ultrasound signals.

11. A method according to claim 1, further comprising selecting the array of transducer elements from elements of the transducer based on a location of the virtual point source relative to the transducer.

12. A method according to claim 11, further comprising selecting the array of transducer elements from elements of the transducer lying within an angular range of a line extending perpendicularly to the transducer from the virtual point source.

13. A method according to claim 11, further comprising selecting the array of transducer elements from elements of the transducer lying within an angular range of a line extending from the virtual point source to a point in a region of interest of the target region.

14. A method according to claim 1, wherein the transmitted ultrasound signals have a frequency of at least 5 MHz.

15. A method according to claim 1, wherein the subset of the array of transducer elements is predetermined based on an imaging geometry.

16. A method according to claim 15 wherein the imaging geometry comprises a location of the virtual point source relative to the transducer.

17. A method according to claim 15 wherein the imaging geometry comprises a location of a region of interest relative to the transducer.

18. A method according to claim 1, wherein the array of transducer elements excludes some elements of the transducer.

19. A method according to claim 1, further comprising selecting an aperture size, wherein the aperture size is a number of elements of the transducer included in the array of transducer elements.

20. A method according to claim 19, further comprising selecting an aperture size based on one or more of the following factors:
   a. the aperture size is limited by a phase difference of the ultrasound signal arrival times at the reference point within the target region;
   b. the aperture size is limited by a magnitude of contribution from elements of the transducer at an arbitrarily chosen target point;
   c. the aperture size is limited by a magnitude of correlation of ultrasound wavefronts emanated from each element of the transducer at an arbitrarily chosen target point; and
   d. the aperture size is limited by a preselected angle originating from the virtual point source and circumscribing a number of the elements of the transducer.

21. An ultrasound imaging apparatus comprising:
   a transducer comprising an array of transducer elements;
   a transmit circuit configured to energize the array of transducer elements to transmit ultrasound signals and to apply transmit delays to the array of transducer elements to emulate a point source located at an emanating point behind the transducer relative to a target region in front of the transducer;
   the transmit circuit configured to apply an apodization function to only a subset of the array of transducer elements, the subset of the array of transducer elements comprising a plurality of adjacent transducer elements determined to have ultrasound signal arrival times at a reference point within the target region that differ by less than a preselected threshold period; and
   a receive circuit connected to the transducer to receive ultrasound signals reflected from the target region; and
   a signal processing circuit configured to process the reflected ultrasound signals to yield an image of the target region.

22. Apparatus according to claim 21, wherein a center of the plurality of adjacent transducer elements is offset from an axis formed by a line perpendicular to the array of transducer elements and intersecting the emulated point source.

23. Apparatus according to claim 21 wherein the apodization function comprises one of the following functions: Hamming, Hanning, Gaussian, cosine, Bartlett, Blackman, and Connes.

24. Apparatus according to claim 21, wherein the apodization function comprises a linear attenuation factor.

25. Apparatus according to claim 21, wherein the preselected threshold period is in the range of 0.4 to 0.6 of a period of the transmitted ultrasound signals.

26. Apparatus according to claim 21, further comprising a user interface and a controller configured to establish the reference point at a location determined in part by a user input provided by way of the user interface.

27. Apparatus according to claim 26, further comprising an imaging depth control wherein the controller is configured to establish the reference point at a distance away from the transducer determined by a setting of the imaging depth control.

28. Apparatus according to claim 26 wherein the user interface comprises a control or controls that enable selecting a region of interest and the controller is configured to establish the reference point at a specified location relative to the region of interest.

29. Apparatus according to claim 21, wherein the reference point is offset from a line extending perpendicularly to the transducer through a location of the emulated point source.

30. Apparatus according to claim 21, wherein the transmitted ultrasound signals have a frequency of at least 5 MHz.

31. Apparatus according to claim 21, wherein the subset of the array of transducer elements is predetermined based on an imaging geometry, and the apparatus comprises a data store identifying the subset of the array of transducer elements.

32. Apparatus according to claim 21, further comprising a processor configured to select an aperture size, wherein the selected aperture size is a number of elements of the transducer included in the array of transducer elements.

33. Apparatus according to claim 32, wherein the processor is further configured to select the aperture size based on one or more of the following factors:
   a. the aperture size is limited by a phase difference of the ultrasound signal arrival times at the reference point within the target region;
   b. the aperture size is limited by a magnitude of contribution from elements of the transducer at an arbitrarily chosen target point;
   c. the aperture size is limited by a magnitude of correlation of ultrasound wavefronts emanated from each element of the transducer at an arbitrarily chosen target point; and
   d. the aperture size is limited by a preselected angle originating from the emanating point.

* * * * *